United States Patent
Olien

(10) Patent No.: US 7,973,769 B2
(45) Date of Patent: Jul. 5, 2011

(54) LOCALIZED HAPTIC FEEDBACK

(75) Inventor: Neil Thomas Olien, Montreal (CA)

(73) Assignee: Immersion Corporation, San Jose, CA (US)

( * ) Notice: Subject to any disclaimer, the term of this patent is extended or adjusted under 35 U.S.C. 154(b) by 700 days.

(21) Appl. No.: 11/618,259

(22) Filed: Dec. 29, 2006

(65) Prior Publication Data

US 2008/0163051 A1 Jul. 3, 2008

(51) Int. Cl.
*G06F 3/041* (2006.01)
(52) U.S. Cl. ......................................... 345/168; 345/156
(58) Field of Classification Search .................. 345/156, 345/168
See application file for complete search history.

(56) References Cited

U.S. PATENT DOCUMENTS

| | | | | |
|---|---|---|---|---|
| 4,263,380 A * | 4/1981 | Riedl | | 429/162 |
| 5,625,286 A * | 4/1997 | Kamiya | | 324/156 |
| 6,603,083 B2 * | 8/2003 | Amari et al. | | 200/5 D |
| 2002/0044132 A1 * | 4/2002 | Fish | | 345/156 |
| 2002/0056614 A1 * | 5/2002 | Amari et al. | | 200/5 D |
| 2006/0256075 A1 * | 11/2006 | Anastas et al. | | 345/156 |
| 2007/0019426 A1 * | 1/2007 | Uken | | 362/494 |
| 2007/0051927 A1 * | 3/2007 | Itoh et al. | | 252/500 |
| 2007/0057924 A1 * | 3/2007 | Prados et al. | | 345/173 |
| 2007/0057928 A1 * | 3/2007 | Prados et al. | | 345/173 |
| 2008/0068334 A1 * | 3/2008 | Olien et al. | | 345/156 |
| 2008/0100568 A1 * | 5/2008 | Koch et al. | | 345/156 |
| 2009/0322496 A1 * | 12/2009 | da Costa | | 340/407.2 |

OTHER PUBLICATIONS

International Search Report—PCT/US2007/083431.
Written Opinion—PCT/US2007/083431.

* cited by examiner

*Primary Examiner* — Bipin Shalwala
*Assistant Examiner* — Afroza Chowdhury
(74) *Attorney, Agent, or Firm* — Pillsbury Winthrop Shaw Pittman LLP

(57) ABSTRACT

A surface for generating an isolated haptic feedback includes an isolated region having a perimeter and a gap surrounding the perimeter, with the gap separating the isolated region from the rest of the surface. The surface further includes a deformable sealing material that is filled within the gap.

26 Claims, 2 Drawing Sheets

LOCALIZED HAPTIC FEEDBACK

FIELD OF THE INVENTION

One embodiment of the present invention is directed to haptic feedback. More particularly, one embodiment of the present invention is directed to localizing haptic feedback to a specific region.

BACKGROUND INFORMATION

Humans interface with electronic and mechanical devices in a variety of applications, and the need for a more natural, easy-to-use, and informative interface is a constant concern. In an automotive environment, the predominate interface is still a mechanical button or dial. One reason for the popularity of this kind of interface is that the driver of an automobile typically must engage a button or dial while maintaining a view of the road. Mechanical devices allow the driver to feel a mechanical button or dial.

However, having mechanical buttons and dials introduces several disadvantages. For one, any type of mechanical interface is subject to wear and degradation. Second, buttons and dials on an automobile dashboard include cracks and crevices that build up dirt and become unsightly and unsanitary. Finally, many automobile manufacturers attempt to create a dashboard having a futuristic sleek look, and mechanical buttons can detract from this appearance.

It is known to use force feedback or vibrotactile feedback (collectively referred to herein as "haptic feedback") in combination with a touchpad or touch control "buttons" in order to eliminate mechanical buttons. However, known haptic feedback devices tend not to isolate the feedback (i.e., vibration) within the boundaries of a specific "button". In many environments, this might not be a large problem. However, in an automobile environment and other environments where a user is not looking at the button when it is being "pressed", it is more important to isolate the haptic feedback to only the targeted region.

Based on the foregoing, there is a need for a system and method in which haptic feedback is applied to a touch control so that the feedback is isolated to a targeted region.

SUMMARY OF THE INVENTION

One embodiment of the present invention is a surface for generating an isolated haptic feedback. The surface includes an isolated region having a perimeter and a gap surrounding the perimeter, with the gap separating the isolated region from the rest of the surface. The surface further includes a deformable sealing material that is filled within the gap.

DETAILED DESCRIPTION

One embodiment of the present invention is a surface having a region that is isolated from the remainder of the surface by a surrounding deformable material, and having an actuator coupled to the isolated region. The actuator creates an isolated haptic feedback effect within the isolated region so that the isolated region may function as a button. Further, the front side of surface, including the area of the button, can be contiguous without cracks, thus resulting in a cleaner and sleeker look.

Figure 1:
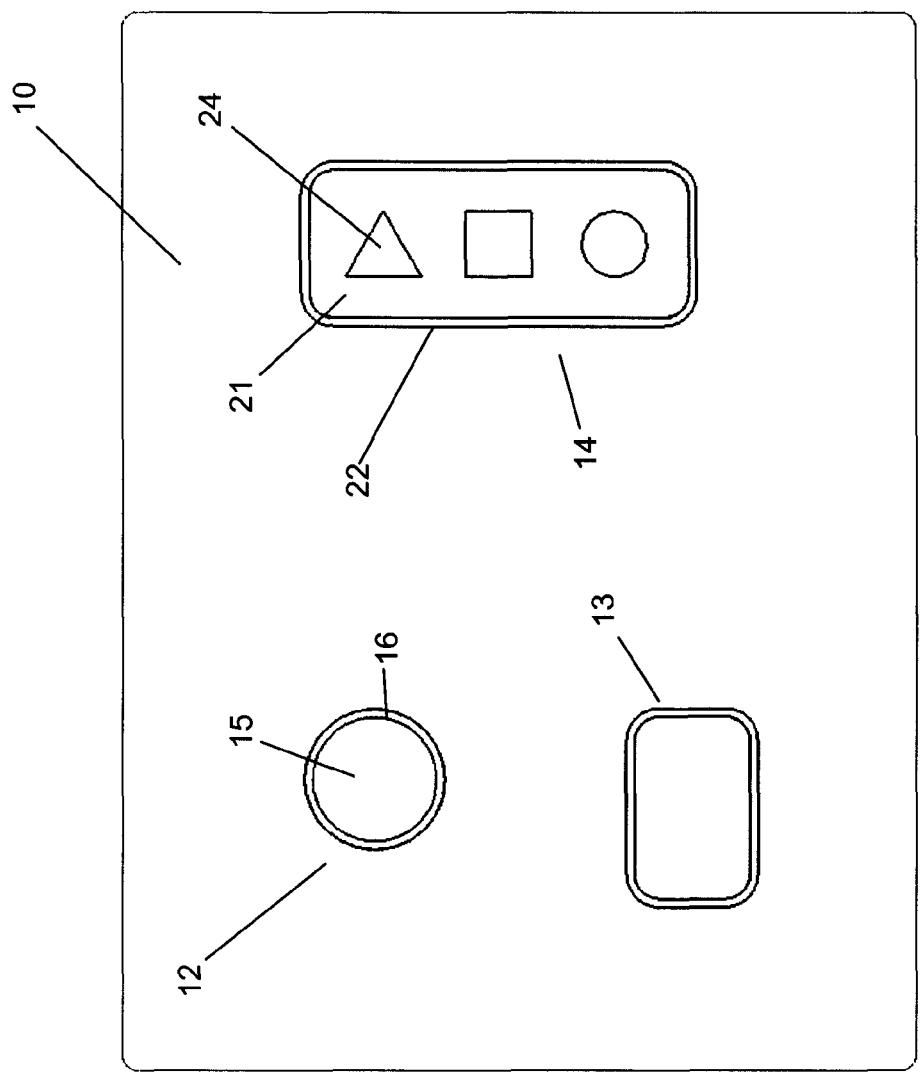
FIG. 1 is a plan view of the front side of a surface with haptic feedback buttons in accordance with one embodiment of the present invention.

FIG. 1 is a plan view of the front side of a surface 10 with haptic feedback buttons 12-14 in accordance with one embodiment. In one embodiment, surface 10 forms a portion of an automotive dashboard. In one embodiment, surface 10 is formed from wood. In other embodiments, surface 10 can be formed of other materials such as, for example, glass, plastic, composite materials such as carbon fiber, and stone. Buttons 12-14 may include a graphical icon 24 to provide visual information to the user.

Each button 12-14 is formed from an interior isolated region 21 (for button 14) that is cut from surface 10 by forming a gap around the perimeter of region 21 through the removal of material from surface 10. The gap formed around region 21 extends completely through surface 10 (i.e., from the front side to the back side of surface 10), and is filled with a deformable sealing material 22. Sealing material 22 allows isolated region 21 to move a small amount relative to the remainder of surface 10 so that a haptic effect can be generated on button 14 that is substantially confined within isolated region 21 of button 14 and generally cannot be felt in other regions of surface 10. The sealing material allows a user to see a contiguous surface. In other embodiments, it may be desired to allow flow of air or water through the seal.

In one embodiment, sealing material 22 is room temperature vulcanized ("RTV") silicone rubber. In one embodiment, the silicone rubber is an ultra soft silicone "00 shore hardness" of 25. In other embodiments, any type of soft material such as rubber foam or felt may be used. In one embodiment, the internal isolated region 15 of round button 12 has an approximate 1" diameter and the gap 16 around button 12, which is filled with sealing material, is approximately 0.062". In this embodiment, the seal around button 12 has an effective spring constant of approximately 10,000 N/m.

Figure 2:
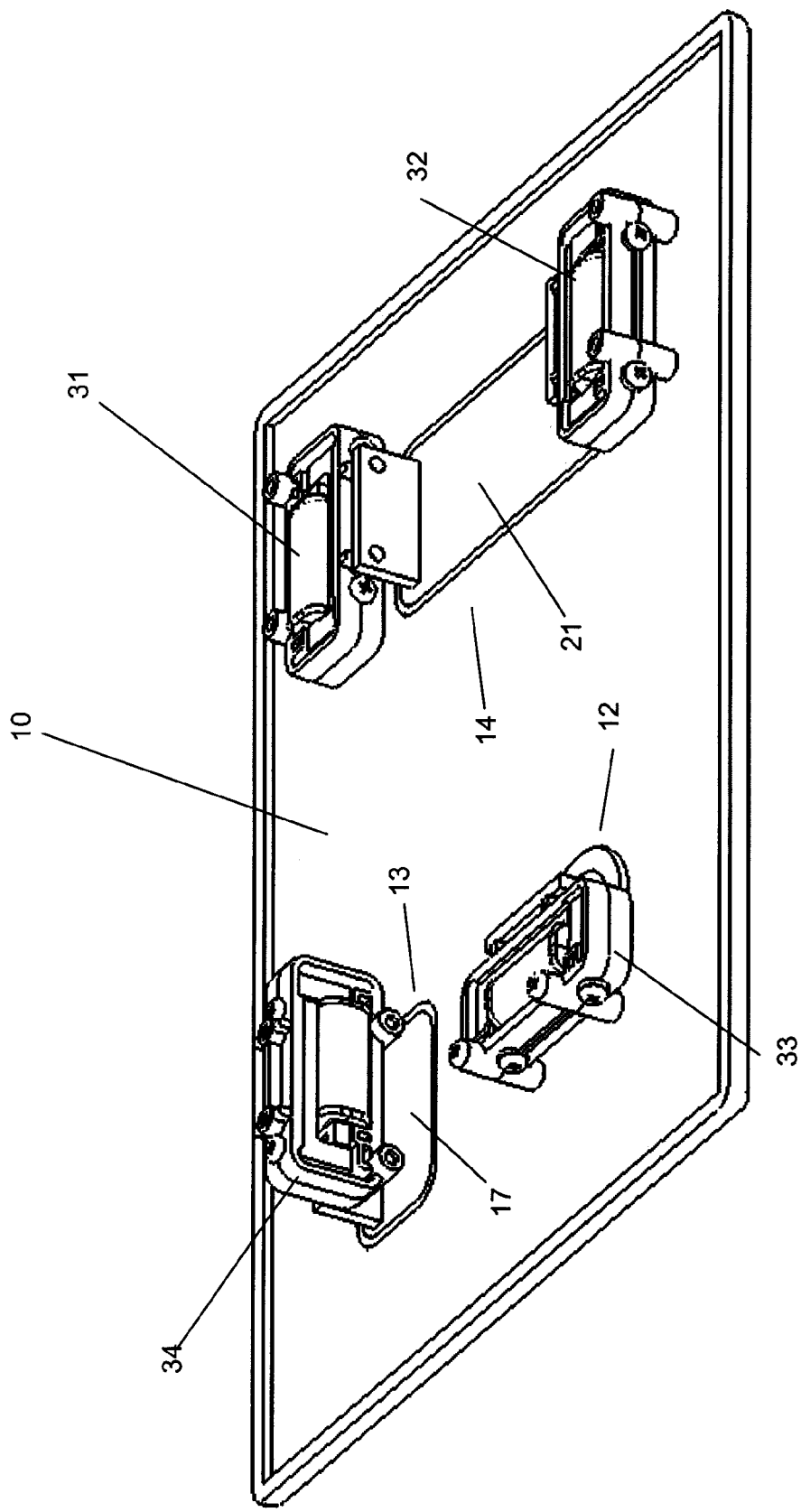
FIG. 2 is a plan view of the rear side of a surface with haptic feedback buttons in accordance with one embodiment of the present invention.

FIG. 2 is a plan view of the rear side of a surface 10 with haptic feedback buttons 12-14 in accordance with one embodiment. On the rear side, each button 12-14 is coupled to at least one actuator 31-34 for generating haptic effects. In the embodiment shown in FIG. 2, actuators 31 and 32 are force displacement electromagnetic actuators that are coupled to both interior isolated region 21 of button 14 as well as an area outside of isolated region 21 in order to ground the actuators. The outside area may be adjacent to button 14 on surface 10 as shown in FIG. 2, or can be any other area that allows the actuators to be grounded. An example of actuators 31 and 32 is disclosed in U.S. patent application Ser. No. 11/128,717 (now U.S. Pat. No. 7,825,903), entitled "Method and Apparatus for Providing Haptic Effects to a Touch Panel".

Actuator 33 is similar to actuators 31 and 32, and actuator 34 differs because it is only coupled to the isolated region 17 of button 13 (i.e., it is not grounded) and uses inertial mass to create the haptic effect. As a result, less force is required on the interior isolated regions of buttons 12-14 to create a relatively strong haptic effect due to the deformable material filled gap around the perimeter. Therefore, an inertial mass type actuator like actuator 34 may be used to generate a haptic effect.

In one embodiment, a film covers the front side of surface 10. The film connects each button to the remainder of the surface by bridging the gap, and provides a seal for the buttons. Examples of film that could be used include brass or steel thin stock (having a few thousands of an inch thickness), Mylar, Velum or plastic films. Other methods for physically attaching each button to the rest of the surface may be used. For example, each button may include a tab that is attached to the surface at one location on the perimeter of the button, while still allowing the button to move relative to the surface.

Although actuators 31-34 shown in FIG. 2 are electromagnetic types of actuators, any type of actuator can be used that can apply a haptic effect or force to surface 10 at the isolated interior regions of buttons 12-14. For example, actuators 31-34 may be a "smart material" such as piezoelectric, electro-active polymers or shape memory alloys, or may be an Eccentric Rotating Mass ("ERM") in which an eccentric mass is moved by a motor, or a Linear Resonant Actuator ("LRA") in which a mass attached to a spring is driven back and forth. Further, a controller and other necessary components (not shown) are coupled to actuators 31-34 in order to create the signals and power to actuators 31-34 to create the haptic effects.

In one embodiment, the appearance and state of each of the buttons 12-14 of FIG. 1 on the front side of surface 10 is enhanced by the addition of an electroluminescent luminescent layer and light emitting diodes ("LED's") applied on the rear side of surface 10 at the location of buttons 12-14, and a portion of buttons 12-14 are made translucent. The luminescent layer creates illumination allowing the icons for the buttons to be visible at night giving the appearance of back lighting. When a button 12-14 is pressed, to provide further feedback to the user, LEDs may be turned on or off to indicate the state of a device controlled by a button, for example the level of heat for a heated seat. In one embodiment, the deformable sealing material and/or the isolated region may be made translucent to facilite the lighting effect.

Although embodiments disclosed above are of an automotive dashboard, other embodiments can be implemented on a surface of any other type of device where isolated haptic effects are desired. Other embodiments can include aircraft buttons, buttons on appliances such as refrigerators, and buttons on medical devices where cleanliness concerns dictate having a smooth button surface.

As described, embodiments create an isolated haptic effect which creates many advantages. Because the haptic effect is isolated, it is stronger and thus can be more easily felt through, for example, a driving glove. Further, multiple buttons 12-14 of FIG. 1 can be pressed at the same time without having the haptic effect from one button bleeding over to the other button, and each button can be separately discernable by the user. These embodiments allow much greater design freedom of switch placement and increased aesthetics along with needed user haptic feedback. Further, these embodiments allow context to be included in the button press because the button does not always have to feel the same due to different available haptic effects. For example, if the button functionality was not permitted at the time of an attempted press, an error buzz effect could be played instead of a standard haptic effect. Further, the isolation of the haptic effect reduces power requirements by localizing the action to a small region, and reduces potential acoustic noise generation.

Several embodiments disclosed are specifically illustrated and/or described herein. However, it will be appreciated that modifications and variations are covered by the above teachings and within the purview of the appended claims without departing from the spirit and intended scope of the invention.

What is claimed is:

1. A surface that facilitates haptic feedback, said surface comprising:
an isolated region that forms a first portion of the surface, the isolated region having a perimeter;
a second region that forms a second portion of the surface, the second region surrounding the perimeter of the isolated region, the isolated region and the second region being formed substantially on the same plane of the surface;
a gap region surrounding the perimeter of the isolated region in between the isolated region and the second region, said gap region separating the isolated region from the second region; and
a deformable sealing material filled within said gap region to form a contiguous surface with the first portion and the second portion on the same plane as the isolated region and the second region, and to facilitate movement of the isolated region relative to the second region.

2. The surface of claim 1, wherein the haptic feedback is generally localized within said isolated region.

3. The surface of claim 1, wherein said isolated region is coupled to an actuator that outputs the haptic feedback.

4. The surface of claim 3, wherein the actuator is coupled outside of said isolated region.

5. The surface of claim 1, wherein the haptic feedback comprises a vibration of said isolated region.

6. The surface of claim 1, wherein said deformable sealing material is silicone.

7. The surface of claim 1, further comprising a luminescent layer coupled to said surface for illuminating said isolated region.

8. The surface of claim 7, wherein said isolated region is translucent.

9. The surface of claim 7, wherein said deformable sealing material is translucent.

10. The surface of claim 1, further comprising a film covering said isolated region and said gap region.

11. A system for providing haptic feedback in response to a user input, said system comprising:
a surface comprising an isolated region that forms a first portion of the surface and a second region that forms a second portion of the surface, the isolated region having a perimeter and the second region surrounding the perimeter, the isolated region and the second region being formed substantially on the same plane of the surface;
a gap region surrounding the perimeter of the isolated region in between the isolated region and the second region, said gap region separating the isolated region from the second region;
a deformable sealing material filled within said gap region to form a contiguous surface with the first portion and the second portion on the same plane as the isolated region and the second region, and to facilitate movement of the isolated region relative to the second region; and
an actuator coupled to said isolated region, wherein the actuator causes the haptic feedback.

12. The system of claim 11, wherein the haptic feedback is generally localized within said isolated region.

13. The system of claim 11, wherein said actuator is further coupled to an area that is outside of said isolated region.

14. The system of claim 11, wherein said actuator is an electromagnetic actuator.

15. The system of claim 12, wherein the haptic feedback comprises a vibration of said isolated region.

16. The system of claim 11, wherein said deformable sealing material is silicone.

17. The system of claim 11, further comprising a luminescent layer coupled to said surface for illuminating said isolated region.

18. The system of claim 11, wherein said isolated region is translucent.

19. The system of claim 11, wherein said deformable sealing material is translucent.

20. The system of claim 11, wherein said gap region separates the isolated region from a remainder of the surface.

21. A method of providing haptic feedback for a haptic enabled location on a surface, said method comprising:
- receiving an indication that the haptic enabled location is pressed, wherein the haptic enabled location is formed from an isolated region that forms a first portion of the surface, wherein the surface includes a second region that forms a second portion of the surface, the second region surrounding the perimeter of the isolated region, the isolated region and the second region being formed substantially on the same plane of the surface, a gap region surrounding a perimeter of the isolated region to thereby separate the isolated region from the second region, and a deformable sealing material filled within said gap region to form a contiguous surface with the first portion and the second portion on the same plane as the isolated region and the second region, and to facilitate movement of the isolated region relative to the second region; and
- generating a haptic effect on the isolated region based on the indication that the haptic enabled location is pressed.

22. The method of claim 21, wherein said generating comprises contacting the isolated region with an actuator on a rear side of the surface.

23. The method of claim 21, further comprising generating illumination at the haptic enabled location when the haptic enabled location is pressed.

24. The method of claim 21, wherein the haptic effect indicates that a haptic enabled location press event has been recognized.

25. The method of claim 21, wherein the haptic effect indicates that the haptic enabled location was pressed in error.

26. A method of providing a surface that includes a haptic enabled location, said method comprising:
- forming a gap region in the surface, wherein the gap region surrounds a perimeter of an isolated region that forms a first portion of the surface and wherein the gap region separates the isolated region from a second region that forms a second portion of the surface, the second region surrounding the perimeter of the isolated region; and
- filling the gap region with a deformable sealing material to form a contiguous surface with the first portion and the second portion on the same plane of the surface, and to facilitate movement of the isolated region relative to the second region.

* * * * *